United States Patent
Schleicher et al.

(10) Patent No.: US 7,288,235 B2
(45) Date of Patent: Oct. 30, 2007

(54) METHOD AND INSTALLATION FOR PURIFYING GAS

(75) Inventors: Andreas Schleicher, Beselich (DE); Gabriele Böhm, Gladbeck (DE); Matthias Küper, Waltrop (DE)

(73) Assignee: Lentjes GmbH (DE)

( * ) Notice: Subject to any disclaimer, the term of this patent is extended or adjusted under 35 U.S.C. 154(b) by 0 days.

(21) Appl. No.: 10/543,973

(22) PCT Filed: Oct. 1, 2004

(86) PCT No.: PCT/EP2004/010972

§ 371 (c)(1),
(2), (4) Date: Jul. 11, 2006

(87) PCT Pub. No.: WO2005/051522

PCT Pub. Date: Jun. 9, 2005

(65) Prior Publication Data

US 2006/0251559 A1    Nov. 9, 2006

(30) Foreign Application Priority Data

Nov. 11, 2003 (DE) ................ 103 52 638

(51) Int. Cl.
*C01B 17/96* (2006.01)
*B01J 10/00* (2006.01)
*B01D 53/50* (2006.01)

(52) U.S. Cl. .................. 423/243.01; 423/243.08; 423/520; 422/168

(58) Field of Classification Search ........... 423/243.01, 423/243.08, 544, 520; 422/168
See application file for complete search history.

(56) References Cited

U.S. PATENT DOCUMENTS 4,085,194 A    4/1978    Otani et al.
4,337,230 A *  6/1982    Ellestad et al. ........ 423/243.03
4,804,523 A *  2/1989    Abrams et al. ......... 423/243.08
5,141,727 A *  8/1992    Varney .................. 423/243.01
5,690,899 A   11/1997    Makkinejad et al.
6,759,019 B1 * 7/2004    Shiraishi et al. ............ 423/210

FOREIGN PATENT DOCUMENTS

| DE | 2 322 958 A    | * 11/1973 |
| DE | 195 27 836 A1  |    1/1997 |
| DE | 195 35 475 C   |    4/1997 |
| DE | 197 52 470 A   |    6/1999 |
| DE | 198 15 207 C   |    6/1999 |
| DE | 197 46 337 A1  |    8/1999 |
| EP | 0 295 908 A2   | * 12/1988 |

* cited by examiner

*Primary Examiner*—Timothy C. Vanoy
(74) *Attorney, Agent, or Firm*—Harness, Dickey & Pierce, P.L.C.

(57) ABSTRACT

The invention relates to a method and an installation for separating sulphur dioxide from exhaust gas, wherein sea water is added to the exhaust gas in an absorption column and the sea water charged with sulphur compounds is extracted from the liquid sump of the absorption column and fresh sea water is added thereto.

In order to omit the very expensive and large secondary reaction basis according to the state of the art, it is proposed to extract the liquid, which contains the bisulphates, from the liquid sump of the absorption column and to mix it with fresh sea water in a pipeline for the purpose of sulphate formation and pH adjustment (neutralization).

The invention is based upon the finding that the sulphate formation and pH adjustment are completed after a reaction time comprised between 1 and 2 minutes. Thus, the large and expensive secondary reaction basin can be omitted.

14 Claims, 1 Drawing Sheet

METHOD AND INSTALLATION FOR PURIFYING GAS

CROSS-REFERENCE TO RELATED APPLICATIONS

This application is a U.S. National Stage (371) of International Application No. PCT/EP2004/010972 filed Oct. 1, 2004, and published in German as WO 2005/051522 A1 on Jun. 9, 2005, which claims the benefit of German Application No. 103 52 638.2, filed Nov. 11, 2003. The disclosures of the above applications are incorporated herein by reference.

The invention relates to a method and an installation for separating sulphur dioxide from exhaust gas, wherein sea water is added to the exhaust gas in an absorption column and the sea water charged with sulphur compounds is extracted from the liquid sump of the absorption column and fresh sea water is added thereto.

Methods for gas purification, in which sea water is used as absorption liquid for separating sulphur dioxide from an exhaust gas stream are for example known from DE-PS 23 22 958. Such methods have become common in practice and are carried out today at some coastal sites. The method makes use of the bicarbonates contained in sea water for the reaction of the absorbed $SO_2$ to innocuous sulphates.

The scrubbing liquid consumption in the absorption zone is determined by the mass transfer between gas phase and liquid phase; on the base of the known measures an as small scrubbing liquid quantity as possible is used. For minimizing the scrubbing liquid consumption, one often uses a packed column, which assures a high mass transfer. If sea water is used as scrubbing liquid, the predetermined scrubbing liquid quantity also determines the available quantity of bicarbonates. This one is regularly only sufficient for binding a fraction of the absorbed $SO_2$ quantity, whereas the much larger part of the $SO_2$ quantity is extracted as dissolved, unbound $SO_2$ with the scrubbing liquid from the liquid sump of the absorption column. Furthermore, the liquid is $CO_2$ saturated because of the high $CO_2$ partial pressure of the exhaust gas. Experience shows that a pH value within the range of pH 2 to 3 is achieved in the liquid sump of the absorption column. In the secondary reaction basin, the scrubbing liquid extracted from the absorption column is mixed with fresh sea water, the quantity of which is determined such that the contents of bicarbonates is sufficient for neutralizing the precipitated sulphur dioxide. The content of the secondary reaction basin has to be intensely aerated for the purpose of sulphate formation on the one hand and $CO_2$ expulsion on the other hand. High quantities of air with corresponding compressor capacities are required. Another aspect is that the pH dependent oxidation speed in a range of above pH 5.5, which is present in the secondary reaction basin, is relatively small. Consequently, large basins have to be used, in order to assure a residence time of the liquid which is sufficient for a complete formation of sulphate. Practice shows that the aerated secondary reaction basin has to be dimensioned for a residence time of 10 to 15 minutes, in order to obtain complete reactions. Another problem is the annoyance caused by bad smell from the secondary reaction basin, which sometimes happens. It is caused by the fact that unbound $SO_2$ escapes from the liquid, which is extracted from the liquid sump of the absorption column and which flows into the secondary reaction basin. The unbound $SO_2$ can hardly be oxidized, even if subjected to a strong aeration.

EP-A-0295908 describes a method for separating $SO_2$ from exhaust gases, wherein sea water is added to exhaust gas in an absorption column and the liquid sump of the absorption column is aerated, whereby bisulphites contained in the liquid are converted to bisulphates. The liquid is extracted from the liquid sump and is further treated in a secondary reaction basin, wherein the liquid is partially returned to the absorption column.

EP-B-0756890 also describes a method for separating $SO_2$ from exhaust gases, wherein it works with smaller installations and smaller air quantities for the formation of sulphate in comparison to EP-A-0295908. Sea water is added to the exhaust gas in the absorption column, wherein the quantity of the sea water is such that the bicarbonates contained in the sea water are sufficient for a stoichiometric conversion of the absorbed sulphur dioxide into bisulphites. Herein, the liquid sump of the absorption column is aerated and the bisulphites are converted into bisulphates, wherein the liquid, which contains the bisulphates, is extracted from the liquid sump of the absorption sump, and fresh sea water is added to the liquid in a secondary reaction basin for the purpose of sulphate formation and pH adjustment. This application also describes the adjustment of a pH value of 4.0-5.

It is the object of the invention to improve the initially mentioned method, such that the very expensive and large secondary reaction basin can be omitted and any annoyance caused by bad smell from escaped $SO_2$ can be safely excluded.

The invention achieves this aim in that the liquid, which contains the bisulphates, is extracted from the liquid sump of the absorption column and, for the purpose of sulphate formation and pH adjustment (neutralization), fresh sea water is added to this liquid in a pipeline. The invention is based upon the finding that the sulphate formation and pH adjustment are completed after a reaction time comprised between 1 and 2 minutes. This depends on the sea water quality, the sulphur content in the gas and the reaction conditions in the liquid sump of the absorption column. Thus, the large and expensive secondary reaction basin can be omitted.

It might be advantageous to additionally aerate the pipeline with oxygen or air in order to support the chemical reaction.

The length of the pipeline can be further reduced, if mixing means are used in the pipeline, which produce a corresponding flow and thus lead to an optimum thorough mixing.

The condition for the omission of the secondary reaction basin is that the oxidation of the desulfurization products is carried out in the liquid sump of the absorption column, wherein simultaneously the total sea water quantity, which is supplied to the absorption column, is determined such that the bicarbonate content is sufficient for a stoichiometric conversion of the absorbed sulphur dioxide into bisulphites, and that a pH adjustment is realized in the liquid sump. Only the combination of these measures allows a shortening of the reaction time, whereby the secondary reaction basin can be replaced with a pipeline.

The scrubbing liquid supplied to the absorption zone of the scrubbing column is dimensioned, without taking care of the described chemical reactions, such that the absorption column achieves a predetermined scrubber efficiency, which is defined as relation between the $SO_2$ output concentration and the $SO_2$ input concentration of the flue gas. Preferably, an absorption column is used, which comprises an absorption zone that is free of inserted pieces and is dimensioned for a high area-specific liquid throughput. If the scrubbing liquid quantity required in the absorption zone is so small that the bicarbonate quantity contained in the sea water is not sufficient for the chemical binding of the absorbed sulphur dioxide, the regulation of the additional sea water stream, which is directly supplied to the scrubbing liquid sump, will be required. If on the other hand, the liquid quantity required for the gas scrubbing is already so high that the sea water supplies over-stoichiometric quantities of bicarbonates, a liquid stream is returned from the liquid sump into the absorption zone of the absorption column and the quantities are regulated such that in the liquid sump of the absorption column a pH value is obtained, which corresponds to the predetermined set value. Due to the scrubbing liquid return, the quantity of bicarbonates available in the absorption column and the hydraulic stress of the absorption zone of the column can be adjusted independently from each other. It is clear that with this mode of operation, an additional sea water stream that is directly supplied to the scrubbing liquid sump can be omitted.

Due to the pH adjustment in the liquid sump of the absorption column, it is assured that the liquid extracted from the liquid sump does no more contain any unbound $SO_2$ in solution, which can escape during the subsequent treatment in the pipeline and lead to any annoyance caused by bad smell. The sulphur dioxide, which has been precipitated in the absorption zone, is converted into bisulphites in the liquid sump or into bisulphates by means of the aeration of the sump. The adjustment of the pH value in the range of pH 4.0 to 5, preferably 4.15 to 4.5, assures a maximum bisulphite concentration in the relatively small partial liquid stream from the absorption column and creates a base for the quick conversion into bisulphates. Due to the highly acid medium, a high oxidation speed is assured, such that a short residence time of the liquid in the liquid sump of the absorption column is sufficient. Depending on the flue gas and sea water quality, the required residence time is comprised between about 1 and 2.5 minutes. Thanks to the set optimum conditions (small liquid stream, higher oxidation speed) the oxidation in the scrubbing liquid sump of the absorption column can be realized with a very small installation effort. Furthermore, due to the small liquid volume, relatively small oxidation air quantities can be used.

The liquid in the liquid sump of the absorption column is efficiently purified from carbon dioxide by means of the oxidation air. $CO_2$ is expulsed from a nearly $CO_2$-saturated solution. Partially neutralized waste water with the intermediate bisulphate is extracted from the liquid sump of the absorption column and is mixed with fresh sea water in the pipeline in order to complete the neutralization and sulphate formation.

It can be advantageous to aerate the pipeline, if the complete oxidation of the bisulphites into bisulphates has not taken place in the liquid sump of the scrubbing column.

The air stream, which is used for the aeration of the liquid sump, is practically cooled by injection of water before entering the scrubbing liquid sump.

In the following, the invention is explained in detail by means of a drawing, which only represents an exemplary embodiment.

BRIEF DESCRIPTION OF THE DRAWING

The present invention will become more fully understood from the description and the accompanying drawing, wherein.

Figure 1:
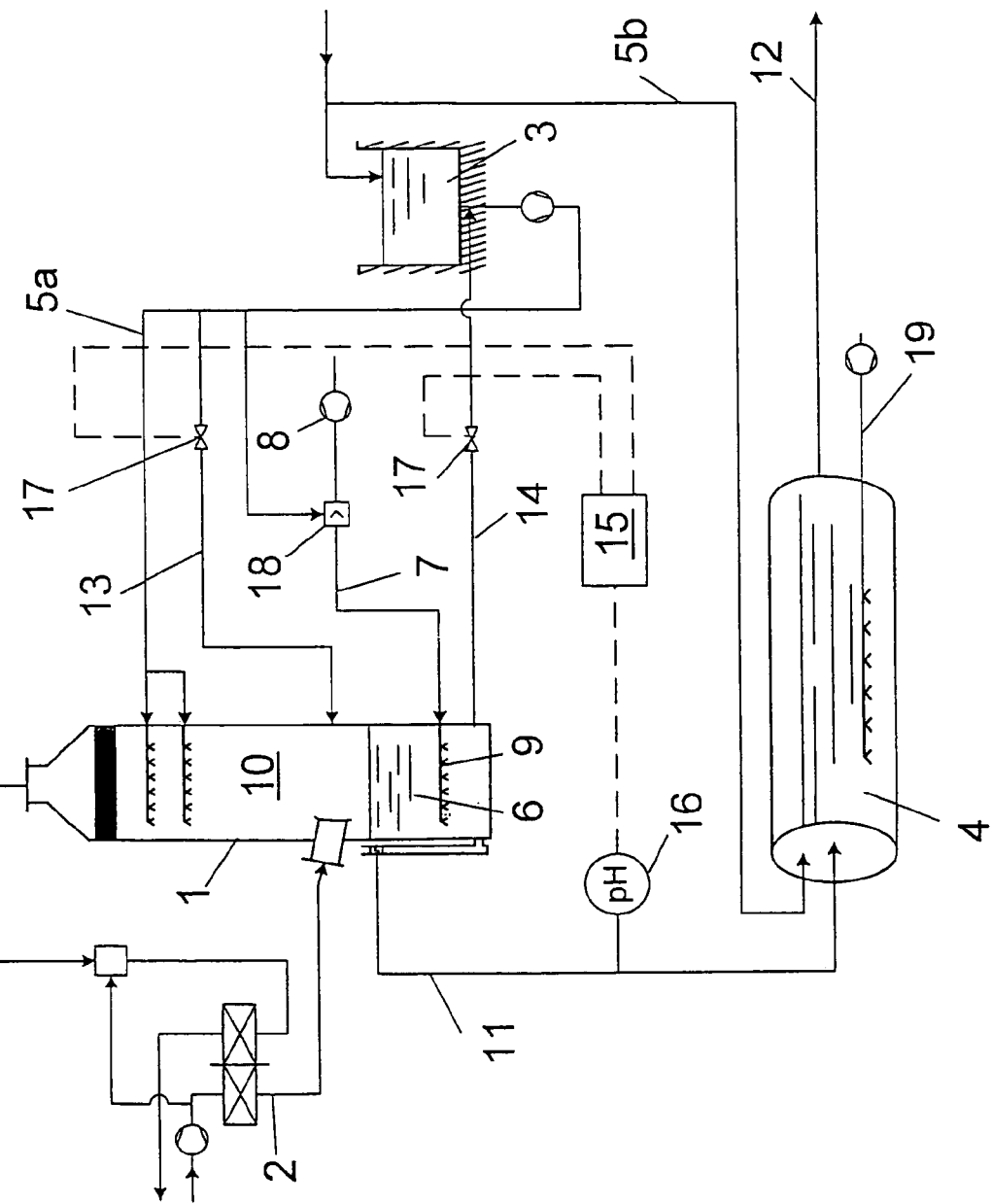
FIG. 1 is a schematic illustration of an embodiment of an installation for separating sulphur dioxide from exhaust gas constructed according to the present teachings.

The principal structure of the installation represented in FIG. 1 comprises an absorption column (1) having a connected exhaust gas pipe system (2), a sea water pumping station (3), a pipeline (4) as well as sea water supply pipes (5a, 5b) to absorption column (1) and to pipeline (4) as well as an aeration device (7), which is connected to the liquid sump (6) of absorption column (1) and which is composed of an air compressor (8) and air lances (9), which are placed in said liquid sump (6). In the exemplary embodiment, absorption column (1) is formed as countercurrent scrubber, wherein sea water is supplied to absorption zone (10) of the column via one or more nozzle levels. Absorption zone (10) of the column does not comprise any inserted pieces. Via a pipe (11) liquid is guided form liquid sump (6) of absorption column (1) into pipeline (4). From pipeline (4) treated waste water (12) is returned into the ocean. The alkalinity of sea water, which is usually indicated as $HCO_3$, is used for binding and neutralizing the $SO_2$ quantity absorbed from the exhaust gas. Standard sea water having a chlorinity of 19 g/kg has a $HCO_3$-content of 0.14 g/kg. Depending on the origin of the sea water, the bicarbonate content can be up to 0.32 g/kg (Arabian Gulf), wherein the mentioned concentrations are mean values, which can locally differ to a high extend, for example in ocean bays or in the proximity of the mouth of a river.

Sea water is added to the exhaust gas in said absorption column (1), wherein the gaseous sulphur dioxide contained in the exhaust gas is physically absorbed in the sea water, which is used as scrubbing liquid.

$$SO_2(gas) \xrightarrow{+H_2O} SO_2(L) \text{dissolved}$$

The total sea water quantity, which is supplied to the absorption column, is dimensioned such that the bicarbonates contained in the sea water are only sufficient for a stoichiometric conversion of the absorbed sulphur dioxide into bisulphites. Liquid sump (6) of absorption column (1) is aerated, whereby the bisulphites are converted into bisulphates. In liquid sump (6), a partial reaction and oxidation takes place, which is expressed by the following sum equation in a simplified manner:

$$SO_2(L) + O(L) + HCO_3 \rightarrow HSO_4 + CO_2(L)$$

The liquid, which contains the bisulphates, is extracted from liquid sump (6) of absorption column (1) and fresh sea water is added to it for the purpose of forming sulphate and adjusting the pH in pipeline (4). The sulphate formation in pipeline (4) can be expressed in a simplified manner by the following sum equation:

$$HSO_4 + HCO_3 \rightarrow SO_4 + H_2O + CO_2(L)$$

Depending on the size of the installation, the quantity of liquid which is extracted from liquid sump (6) is comprised between 8000 and 40000 m³/h. With a complete conversion of the bisulphates into sulphates and the complete pH adjustment in pipeline (4), a quantity comprised between 8000 and 120000 m³/h sea water is introduced into pipeline (4). Usually pipeline (4) is operated with rates of flow comprised between 1.5 and 3.5 m/s, such that the diameter is 1.2 to 6.2 m. With an average conversion time of 90 seconds, in which the sulphate formation and neutralization is completed, and with the above mentioned rates of flow, the pipeline length is 20 m through 60 m.

A shorter pipeline length is achieved, when corresponding mixing devices, for example mixers in form of baffle plates or agitators, are used.

A $CO_2$ saturation of the sea water takes place in absorption zone (10) of absorption column (1). In said liquid sump, $CO_2$ is expulsed by oxidation air. Due to the secondary reaction, the waste water in pipeline (4) is again enriched with respect to dissolved carbon dioxide. For the pH value of the waste water extracted from pipeline (4), the concentrations of free $CO_2$ and excess bicarbonate are principally decisive. They can be influenced the best by increasing the totally used sea water quantity. Besides, a limited influence can also be obtained by $CO_2$ expulsion in pipeline (4). For this, the aeration device (19) can be used.

There can also be the case that the liquid quantity required for the gas scrubbing in the absorption zone is so high that if sea water is used as scrubbing liquid, the liquid supply (5a) will provide absorption column (1) with over-stoichiometric quantities of bicarbonates. This is over all the case, if the $SO_2$ concentration in the exhaust gas stream is low and sea water having a high bicarbonate portion is available. In such a case, experience shows that for reducing an over-stoichiometric bicarbonate quantity, a liquid stream is returned from liquid sump (6) via a return pipe (14) into absorption zone (10). Due to the scrubbing liquid return, the bicarbonate quantity, which is available in absorption column (1), and the hydraulic stress of absorption zone (10) of said column can be set independently from each other. The fresh water dosage by means of pipe (13) to liquid sump (6) of absorption column (1) is omitted. The reaction for forming sulphate is already partially produced in liquid sump (6) of said absorption column. The bicarbonate quantity, which is available for the chemical reactions, can be controlled by means of liquid stream (14) returned from liquid sump (6) into absorption zone (10).

Both the additional sea water stream (13) and the liquid stream (14) returned from liquid sump (6) into absorption zone (10) can be regulated. The rate control is carried out depending on the pH value of the liquid extracted from liquid sump (6). For this purpose, a measuring and control unit (15) comprising sensor (16) for the detection of the instantaneous pH value as well as control units (17) for the rate control of the additional sea water stream as well as of liquid stream (14), which is returned from liquid sump (6) into absorption zone (10), are provided. The pH value of the liquid which is extracted from liquid sump (6) of absorption column (1) is measured and measured values differing from a set value within the pH range comprised between 4.15 and 4.5 are determined. According to these variations of the measured values, the rate of flow of the supplied additional sea water stream (13) or of liquid stream (14) returned from liquid sump (6) into absorption zone (10) is regulated. Due to the pH dependent rate control, the pH value of liquid sump (6) is kept constant within a narrow tolerance range comprised between pH 4.15 and pH 4.5.

It is known that with the used sea water, one can expect the maximum bisulphite concentration at pH 4.15. At a lower pH, rests of dissolved, unbound $SO_2$ can still be found in solution, whereas at higher pH values, smaller quantities of sulphite ions are found. The method according to the invention, which provides a precise dosage and regulation of the sea water, assures the $SO_2$ absorbed in the scrubbing liquid is completely bound and no more present in solution as free unbound $SO_2$. The pH adjustment according to the invention within the range comprised between pH 4.15 and pH 4.5 further assures that the pH value of the scrubbing liquid extracted from absorption column (1) and supplied to pipeline (4) is very close to the optimum point for forming bisulphites. The measures according to the invention lead to the result that the liquid, which is introduced into the pipeline, is free from any smell, because gaseous $SO_2$ can no more escape, and that the intended oxidation in liquid sump (6) takes place very quickly due to the high bisulphite concentrations that are prevailing there. Due to the high oxidation speed, short residence times of the liquid in liquid sump (6) can be used. Depending on the flue gas and sea water quality, a residence time comprised between 1 and 2.5 minutes is sufficient.

By adding fresh sea water, a pH value comprised between pH 6.0 and pH 7 is fixed in pipeline (4). About ⅓ of the sea water, which is in total supplied to the installation, are introduced into scrubbing column (1) and about ⅔ are introduced into pipeline (4). Since the oxidation has been shifted to scrubbing liquid sump (6), essentially smaller air quantities can be used in comparison to the state of the art, in which the oxidation takes place in a secondary reaction basin. The air stream used for aeration is practically cooled by water injection. For this purpose, aeration device (7) comprises an injection (18) of quench water, wherein as quench water also sea water can be used.

The invention claimed is:

1. A method for separating sulphur dioxide from exhaust gas, wherein sea water is added to the exhaust gas in an absorption column, and the liquid sump of said absorption column is aerated and bisulphites contained in the liquid are converted into bisulphates thereby, and that the liquid is extracted from said liquid sump of said absorption column and is mixed with fresh sea water for the purpose of sulphate formation and neutralization, characterized in that the mixing with fresh sea water for the purpose of the sulphate formation and neutralization takes place in a pipeline.

2. A method according to claim 1, characterized in that the sulphate formation and neutralization of the liquid extracted from said liquid sump of said absorption column by means of fresh sea water takes 1 to 2 minutes.

3. A method according to claim 1, characterized in that the sulphate formation and neutralization of the liquid extracted from said liquid sump of said absorption column by means of fresh sea water is realized in pipeline by means of a mixing device.

4. A method according to claim 1, characterized in that said pipeline is aerated.

5. An installation for separating sulphur dioxide from exhaust gas according to the method of claim 1, consisting of an absorption column comprising an absorption zone and a liquid sump, wherein exhaust gas is introduced into said absorption zone and is mixed with sea water, wherein said liquid sump of said absorption column comprises an aeration device for converting bisulphites into bisulphates, and wherein the liquid is extracted from said liquid sump of said absorption column via a pipeline and is mixed with fresh sea water for the purpose of sulphate formation and neutralization, characterized by a pipeline which is connected to a fresh sea water reservoir via a first pipeline and the liquid sump of said absorption column via a second pipeline to allow the sulphate formation and neutralization.

6. An installation for separating sulphur dioxide from exhaust gas according to claim 5, characterized in that said pipeline comprises a mixing device.

7. An installation for separating sulphur dioxide from exhaust gas according to claim 5, characterized in that said pipeline comprises an aeration device.

8. An installation for separating sulphur dioxide from exhaust gas according to claim 5, characterized in that said pipeline has a length comprised between 20 m and 60 m.

9. A method according to claim 2, characterized in that the sulphate formation and neutralization of the liquid extracted from said liquid sump of said absorption column by means of fresh sea water is realized in pipeline by means of a mixing device.

10. A method according to claim 2, characterized in that said pipeline is aerated.

11. A method according to claim 3, characterized in that said pipeline is aerated.

12. An installation for separating sulphur dioxide from exhaust gas according to claim 6, characterized in that said pipeline comprises an aeration device.

13. An installation for separating sulphur dioxide from exhaust gas according to claim 6, characterized in that said pipeline has a length comprised between 20 m and 60 m.

14. An installation for separating sulphur dioxide from exhaust gas according to claim 7, characterized in that said pipeline has a length comprised between 20 m and 60 m.

* * * * *